June 13, 1967 C. E. GUTSHALL 3,324,491
METHOD AND APPARATUS FOR HEADING ROTARY FASTENERS
Filed Feb. 2, 1965 2 Sheets-Sheet 1
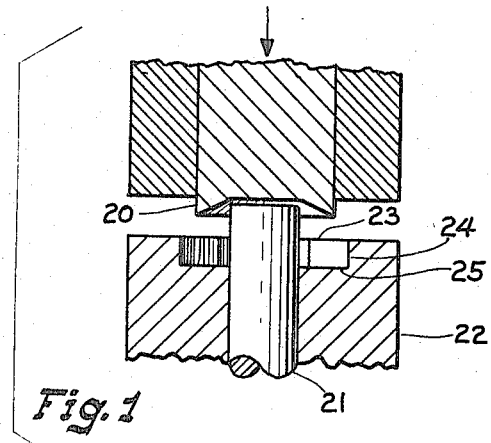
Fig. 1
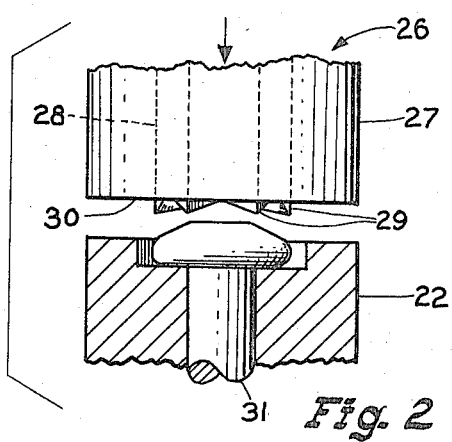
Fig. 2
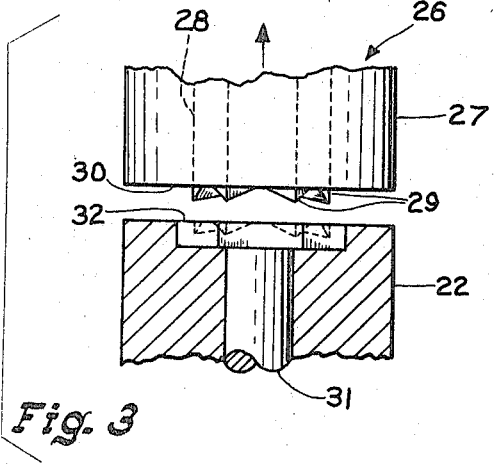
Fig. 3
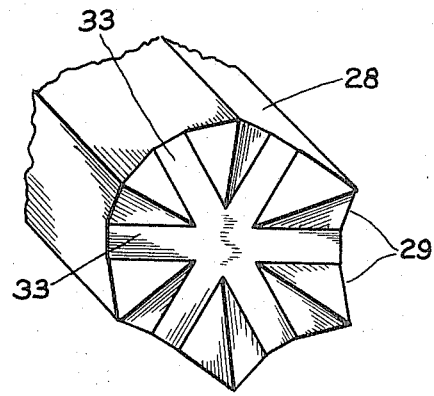
Fig. 4
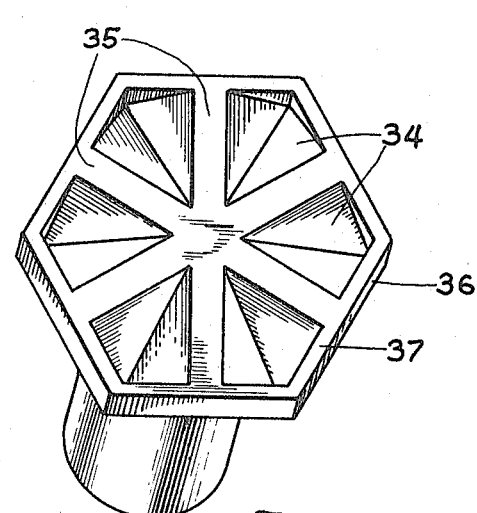
Fig. 6
Fig. 5
INVENTOR.
Charles E. Gutshall
BY Robert W. Beart
Don R. Wilson
His Att'ys

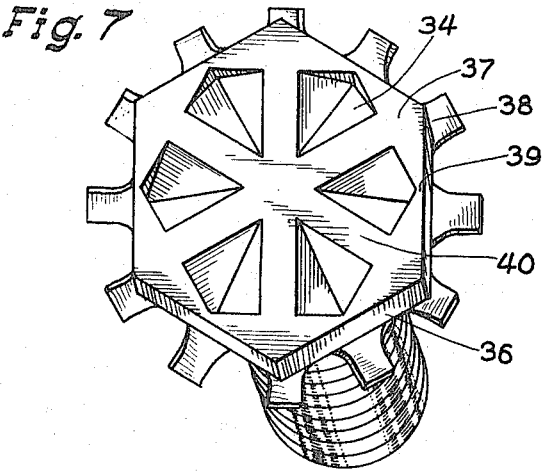
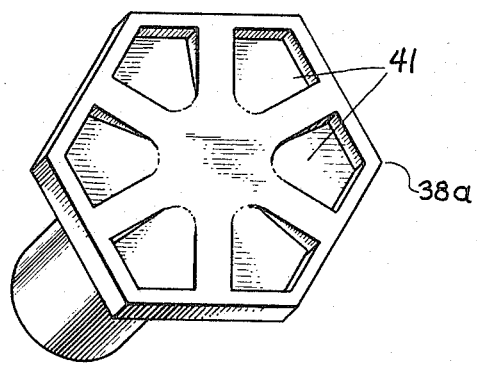
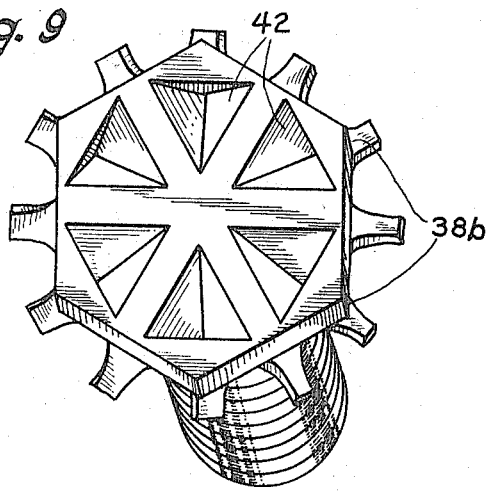
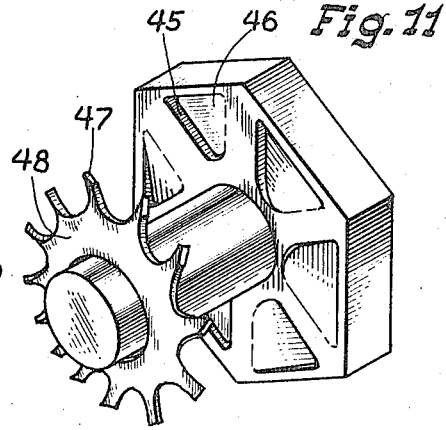
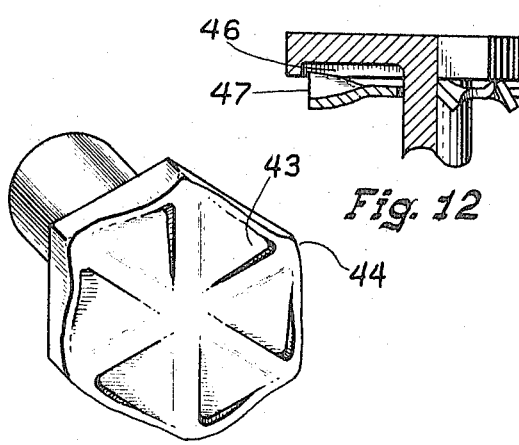
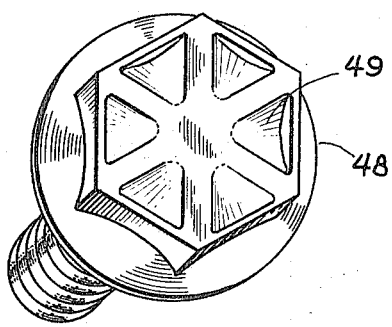

United States Patent Office 3,324,491
Patented June 13, 1967

3,324,491
METHOD AND APPARATUS FOR HEADING ROTARY FASTENERS
Charles E. Gutshall, Roselle, Ill., assignor to Illinois Tool Works Inc., Chicago, Ill., a corporation of Delaware
Filed Feb. 2, 1965, Ser. No. 429,861
6 Claims. (Cl. 10—24)

This invention relates to improved method and apparatus for cold forming polygonal heads on wire stock in the manufacture of rotary fasteners. More particularly, the invention relates to method and apparatus for displacing selectively discrete sections of material on the surface of an upset wire blank so as to move material to form the periphery or edge of polygonal heads for rotary fasteners.

In cold forming of the head on bolts and screws or in cold heading as it is called, one end of a cylindrical piece of wire stock is upset or deformed to produce an enlargement or head on one end of the shank, the shank being subsequently threaded. The cold flow of non-ductile metals such as steel requires high compression forces and even with such forces, moving material to the periphery of the head is relatively difficult. On the other hand, it is at the periphery that contact is made for tightening purposes and therefore complete filling of the edges of the head is most important.

The formation of heads on such fasteners by cold forming has come to include the punching of a deep recess or indentation on the upper surface of the head. Such a recess or indentation covers an area only slightly less than the total top surface of the completed head and has a flat or essentially flat bottom. In either case, a relatively large amount of the metal forming the head is moved radially outward over the face end of the die punch to produce the periphery beyond the recess or indentation. This method and apparatus moves a relatively large amount of material over the face of the punch with attendant wear and occasionally with inaccurate and incomplete forming of the head periphery. In addition, by the very design of the products, the result is a full head height only at the rim or periphery, the large center section of the head being deeply indented.

In rotary fasteners of standard head height, this thin rim remaining after the punching of the deep indentation as described above, is supplemented by a substantial depth of fully formed head below the bottom of the deep indentation. In these, the thin rim above the bottom of the indentation serves more as an aid to appearance, only that portion of the head below the recess providing the necessary strength to resist torgue as it is being applied to the fasteners.

The fact that a thin rim of metal at the periphery of a head made with a deep indentation is inherently incapable of resisting much torque makes such prior art apparatus and method inapplicable to cold heading of shallow head fasteners. Such fasteners are those in which head height is only approximately equal to or less than one-half the diameter of the wire stock from which the fastener is formed. Their application is generally in locations where space is limited and therefore head height must be minimized.

These shallow head fasteners do not have sufficient head height to permit deep and essentially complete surface indentation of the head. To use the prior art methods would leave insufficient material below the bottom of the indentation and would result in torque being essentially applied to the periphery of a head so reduced in strength as to make it unable to withstand deformation during tightening operations.

An additional problem is that a completely formed, well-defined periphery is particularly important in shallow head fasteners because there is relatively little area of contact between the head and wrench. This type of fastener must of necessity have completely formed strong corners which are the points at which torque is primarily resisted.

Because of these factors, shallow head fasteners continue to be made by trimming of a circular head to remove portions of the head circle outside the outline of the desired final polygonal head. This is a relatively expensive operation in that it requires extra processing steps and produces considerable waste in the form of scrap pieces removed in the trimming of the head.

Accordingly, it is an object of this invention to provide improved method and apparatus for cold forming of shallow polygonal heads on rotary fasteners.

A further object of the invention is to provide method and apparatus for cold heading of shallow head rotary fasteners which does not substantially reduce the peripheral strength at the upper surface of the fastener head.

A further object of the invention is to provide method and apparatus for producing completely formed strong driving corners on shallow head rotary fasteners.

Another object of the invention is to provide method and apparatus for eliminating waste in the form of scrap material in the production of shallow head rotary fasteners.

A further object of the invention is to provide method and apparatus for cold forming shallow polygonal heads on fasteners with a large section of the top surface of the head being flat and of a height equal to the height of the periphery of the head.

These and related objects are accomplished by my invention wherein a piece of wire stock or wire blank is upset within a die means so as to form an enlargement along one end of the wire. Material on the upper surface of this upset wire blank is then displaced downwardly to thereby move material radially outwardly to form the periphery while at the same time selectively discrete sections of the upper surface of the upset wire blank are further displaced downwardly to increase the movement of material radially outwardly. In this manner most of the material on the upper surface of the blank can be moved radially outwardly between the selectively discrete sections with a minimum of downward displacement. The selectively discrete sections of material in this wire blank on the upper surface of the upset end are then further displaced downwardly to thereby move material radially outwardly to the wall of the die means and upwardly to the face of the displacement die punch radially beyond said selectively discrete sections to insure a complete filling and forming of the periphery including the upper surface margin of the shallow polygonal head being formed.

Further description of the invention will be by reference to the accompanying drawings in which:

FIG. 1 is a cross-section of the apparatus used in the first step of the method to upset an end portion of the wire blank from which a shallow head rotary fastener is to be made;

FIG. 2 is a partial cross-section of the apparatus used in the second step of the method showing the upset wire blank in position immediately prior to the second step of the operation which material is displaced downwardly and radially outwardly;

FIG. 3 is a partial cross-section of the same apparatus pictured in FIG. 2 as the displacement punch is withdrawn following the displacing of selectively discrete sections of the wire blank represented by the broken lines in this figure;

FIG. 4 is a perspective view of the displacement punch used in the apparatus of FIGS. 2 and 3 to produce the displacement of the selectively discrete sections of material on the upper surface of the upset blank;

FIG. 5 is a perspective view of a similar punch insert which produces deeper and more substantial downward displacement of discrete sections of the material on the upper surface by reason of the deeper cuts made on the face of the displacement punch pictured in FIG. 4;

FIG. 6 is a perspective view of a completely formed shallow head with indentations on the upper surface of the fastener head produced by the displacement of material from these discrete sections by the displacement punch shown in FIG. 4;

FIG. 7 is a perspective view of a fastener with assembled lock washer, the displacement of selectively discrete sections of material on the upper surface of the head having been likewise produced by the displacement punch of FIG. 4 so positioned in relation to the configuration of the die means as to be rotated thirty degrees from the positioning of the same displacement punch used to produce the fastener head shown in FIG. 6;

FIG. 8 is another embodiment of the completed fastener head produced by the method and apparatus of this invention, the taper in the discrete indentations and in the corresponding displacement punch being only radial to the fastener shank axis;

FIG. 9 is a complete fastener assembly comprising fastener and lock washer, taper in the contour of the discrete sections being both radial to the shank axis and transverse to such radii;

FIG. 10 is a perspective view of a fastener blank with head fully formed by the method and apparatus of this invention prior to the thread forming on the shank, with taper in the contour of the sections displaced being both radial and transverse to the radii so as to produce a head properly resistant to torque forces in one direction of rotation but susceptible to deformation by torque applied in the reverse direction;

FIG. 11 is a perspective view of a fastener blank and lock washer prior to threading made by the method and apparatus of this invention showing the retrograde side, the sections on this underside being displaced leaving such a contour in the displaced sections as to provide an abrupt or vertical wall on one edge of each of the displaced sections which would be resisted in reverse rotation by the twisted teeth of the lock washer;

FIG. 12 is a partial cross-section of the fastener assembly shown in FIG. 11, with the lock washer toothed edge extending into the displaced section of the retrograde side of the fastener head;

FIG. 13 is a perspective view of a flanged head on a rotary fastener, the discrete sections of displaced material on the upper surface of the completed head being tapered radially with a uniform slope and tapered transverse to the radii by way of spaced convex curved surfaces on the face of the displacement punch.

An embodiment of the method of this invention can best be described by reference to FIGS. 1, 2 and 3 which show apparatus representative of that which can be used in the practice of this invention. Upset punch 20 having a frusto-conical face configuration descends upon and contacts wire blank 21 having been placed directly beneath it within die block 22. Although the particular configuration of the upset punch is not critical, there are advantages in having the length of the horizontal surface approximately equal to the diameter of the wire blank. By having approximately one-third of the total material to be moved being displaced on this first blow by upset punch 20 the heat produced by molecular friction within the material is generally sufficient to offset any work hardening effects that might otherwise occur with a more extensive upset. It can be appreciated that the volume of the wire stock extending completely out of the die block 22 is equal to the amount of material to be displaced and in combination with the volume of the wire stock within die cavity 23 constitutes the complete volume of the head to be formed within the space defined by wall 24 and floor 25 of die cavity 23.

After upset punch 20 has been raised and returned to its original position, die block 22 is placed beneath displacement punch 26 of FIG. 2 consisting of punch casing 27 and punch insert 28. As the displacement punch 26 descends, discrete protuberances on the end of punch insert 28 along with punch face 30 make contact with and displace the surface of the upset blank consisting of the upset end portion of shank 31 as can best be seen in FIG. 2. In this step of the process material is displaced downwardly and extruded outwardly, a substantial portion of the material moving outwardly over the punch face 30 between the discrete protuberances 29. These protuberances 29 further displace discrete sections of material downwardly thereby moving material radially outwardly to points radially beyond these protuberances at which points the material then can flow upwardly to and against punch face 30 to form the periphery including the upper surface margin of the polygonal head.

Returning displacement punch 26 to its raised position leaves a completely formed polygonal head 32 on shank 31 as shown in FIG. 3. The selectively discrete sections displaced in this final step of the method by discrete protuberances 29 on punch face 30 are shown in broken lines.

Although displacement punch 26 is shown as a composite of punch casing 27 and punch insert 28, it may be provided as an integral unit. In such case, the representative punch inserts shown in FIGS. 4 and 5 would each be provided with a skirt or flange having a surface continous with and connecting the terminal ends of grooves 33 in which case the protuberances 29 would extend from and be surrounded by a continuous surface consisting of the grooves and skirt.

By further grinding of the grooves 33 in the punch insert 28 of FIG. 4, a modified punch insert 28a of FIG. 5 is produced. Grooves 33a can similarly be made a continuous surface with a skirt surrounding the punch insert. When used in the method of this invention, these discrete protuberances 29a effect additional downward displacement of discrete sections on the surface of the upset wire blank and, of course, produce deeper indentations in the final polygonal head. Taper in the surfaces of these discrete protuberances, both in a radial direction and transverse to such radii, permits an even displacement of material both radially and transverse to the radii so as to produce a progressively increasing measure of displacement of material in the surface of the upset wire blank.

By selective placement of the discrete protuberances various results are possible in the performance of the completed polygonal head on the fastener. In FIG. 6 are shown indentations 34 and intervening lands 35 produced by the displacement of punch insert 28 represented in FIG. 4. The bottoms of the identations taper both radially and transverse to the radii with the radial center of the indentation being directed toward the corners of the completely formed periphery 36 including upper surface margin 37.

By rotating punch insert 28 of FIG. 4 thirty degrees from the positioning employed in producing the fastener head of FIG. 6, a completed head results as shown in FIG. 7 in which substantially more material is found on the upper surface 37 in the corners 38 with the indentations 34 being between the corners of the completed polygonal head. Conversely, relatively less material is found on the upper surface at points 39 midway between the formed corners. Such displacement of selectively discrete sections of material from the upper surface of the upset wire blank as is shown here produces corners of maximum height and therefore of maximum strength and it is to be noted that opposite corners are connected by lands 40 so as to give maximum strength throughout the height of the periphery 36 of the completed head.

By displacing selectively discrete sections of material as shown in FIG. 8, indentations 41 are produced with taper only in a radial direction, the particular displacement shown here being such as to move relatively lesser amounts of material into the corners 38a of the completed polygonal head comparable to the head shown in FIG. 6. On the other hand, by the displacement represented in FIG. 9 material is again displaced in relatively larger amounts into the corners 38b of the completed head with taper in the bottoms of the indentations 42 being both radial and transverse to the radii as in the polygonal head of FIG. 7. By moving substantially more material toward corners 38b, maximum head height and maximum corner strength is obtained for resisting torque.

The effect of displacing selectively discrete sections of material in the upper surface of the upset wire blank may perhaps be most clearly seen by reference to the polygonal head of FIG. 10 in which material is displaced on the order of one-half as much as is displaced by the methods and apparatus described above. By taper into only one corner 43 of a triangle, maximum indentation occurs just ahead, in a clockwise direction, of the corners 44 of the polygonal head in which case the corners are full in a clockwise direction and have good driving edges but are relatively empty in the reverse direction and are therefore weaker in removal thus providing an easily driven but difficultly removable rotary fastener.

In FIG. 11 the displacement of selectively spaced sections of material is done on the retrograde or underneath side of the fastener head. In practice this can be accomplished either by incorporating discrete protuberances on the floor of the die cavity of the die block or by the use of a step in which the upset wire blank is struck from beneath. It is, of course, possible that the upset wire blank be simultaneously struck both from above and beneath where indentations are to be produced on both surfaces. By appropriate selection of the method in which material is displaced on the retrograde surface an abrupt wall 45 is formed on one edge of indentation 46 which would coincide with or subsequently engage a twisted tooth 47 on lock washer 48. As shown in FIG. 12, twisted tooth 47 extends into indentation 46.

Although the shallow head fasteners produced by the method of this invention would not normally be made with an integral washer base 48 as shown in FIG. 13 it is nevertheless possible to incorporate such a flange onto the lower surface in a head having material displaced on the surface in selectively discrete sections, the particular indentation 49 being concave with a uniform rate of taper in the radial direction only.

It can thus be seen that by the method and apparatus of this invention it is possible to produce shallow polygonal heads, which are heads wherein the head height is approximately equal to or less than one-half the diameter of the wire stock, with nominal, if any, reduction in the head strength while eliminating the extra effort and expense of trimming such shallow heads to their polygonal shapes according to prior art methods. By the method and apparatus of my invention it is possible to fully form shallow head fasteners having a substantial portion of the top surface coplanar with the top edge of the periphery and to that extent similar in appearance and performance to a full height head fastener having no displacement of surface material as in the prior art trimmed head fastener.

Although the invention has been described by references to specific embodiments it can be readily recognized that many modifications are possible and accordingly the broader concepts of the invention are not to be restricted except to the degree required by the prior art and by the following claims.

I claim:

1. A method of cold forming a shallow polygonal head having a head height not greater than one-half the diameter of the shank on a rotary fastener comprising displacing the upper surface of an upset wire blank downwardly within a die means to move at least the outer edge portions of the upset blank radially outwardly into contact with the walls of the die means and at the same time further displacing selectively discrete sections of material on the said surface of the upset wire blank to increase the movement of material radially outwardly, the displacement of said selectively discrete sections of material taking place to a greater extent at the periphery of the upset blank than at the axis, a substantial portion of the material on the said surface of the upset wire blank moving between said discrete sections, such displaced discrete sections displacing material radially outwardly to the wall of the die means, to the face of the displacement punch, and to the floor of the die cavity to form the periphery of the polygonal head.

2. The method of claim 1 in which further displacing of selectively discrete sections of material occurs on the upper surface of the upset wire blank.

3. The method of claim 1 in which further displacing of selectively discrete sections of material occurs on the lower surface of the upset wire blank.

4. Apparatus for cold forming a shallow polygonal head on a rotary fastener having a head height not greater than one-half of the diameter of the wire blank from which the fastener is formed comprising die means defining the final periphery and height of the head of the fastener being formed, means for upsetting an end portion of said wire blank to a diameter less than the diameter of the peripheral portions of the die and to a height greater than the height of the die, punch means for displacing the upper surface of the upset wire blank downwardly into the die means and means including portions extending axially to a greater extent at the periphery thereof than at the axis for simultaneously further displacing selectively discrete sections of material on a surface of the upset wire blank to a greater extent at the periphery than at the axis whereby to move material radially outwardly to fill said die means defining the periphery and the height of the head of the fastener being formed.

5. The apparatus of claim 4 in which means for further displacing selectively discrete sections of material are discrete protuberances on a displacement punch face.

6. The apparatus of claim 4 in which means for further displacing selectively discrete sections of material are discrete protuberances on the floor of the die cavity.

References Cited

UNITED STATES PATENTS

| | | | |
|---|---|---|---|
| 162,642 | 4/1875 | Frearson | 10—7 X |
| 2,716,759 | 9/1955 | Merlin et al. | 10—26 |
| 2,939,160 | 6/1960 | Mitchell | 10—26 |
| 3,166,769 | 1/1965 | Wieber | 10—27 X |

ANDREW R. JUHASZ, *Primary Examiner.*